United States Patent [19]
Kawakami et al.

[11] Patent Number: 4,860,109
[45] Date of Patent: Aug. 22, 1989

[54] IMAGE PROCESSING APPARATUS

[75] Inventors: Katsura Kawakami, Yokohama; Shigeo Shimazaki, Kawasaki; Satoshi Takayama, Kawasaki; Chika Onodera, Kawasaki, all of Japan

[73] Assignee: Matsushita Electric Industrial Co., Ltd., Osaka, Japan

[21] Appl. No.: 137,028

[22] Filed: Dec. 23, 1987

[30] Foreign Application Priority Data

Jan. 7, 1987 [JP] Japan ................................. 62-1239
Feb. 26, 1987 [JP] Japan ................................. 62-43335

[51] Int. Cl.$^4$ ............................................. H04N 1/40
[52] U.S. Cl. ................................... 358/400; 358/434; 358/443
[58] Field of Search ............... 358/256, 293, 296, 280, 358/257

[56] References Cited

U.S. PATENT DOCUMENTS

| | | | |
|---|---|---|---|
| 4,231,069 | 10/1980 | Wellendorf | 358/256 |
| 4,445,195 | 4/1984 | Yamamoto | 358/256 |
| 4,454,575 | 5/1984 | Bushaw | 358/256 |
| 4,491,874 | 1/1985 | Yamamoto | 358/296 |
| 4,506,342 | 3/1985 | Yamamoto | 355/14 C |
| 4,545,068 | 10/1985 | Tabata | 358/256 |
| 4,566,038 | 1/1986 | Dimick | 358/256 |
| 4,581,656 | 4/1986 | Wada | 358/257 |
| 4,602,275 | 7/1986 | Smith | 358/11 |
| 4,604,653 | 8/1986 | Shimizu | 358/256 |
| 4,641,197 | 2/1987 | Miyagi | 358/256 |
| 4,672,462 | 6/1987 | Yamada | 358/256 |
| 4,706,127 | 11/1987 | Nobuta | 358/280 |
| 4,719,514 | 1/1988 | Kurahayashi | 358/280 |
| 4,727,435 | 2/1988 | Otani | 358/256 |
| 4,733,305 | 3/1988 | Miura | 358/280 |
| 4,746,980 | 5/1988 | Petersen | 358/280 |

FOREIGN PATENT DOCUMENTS 0145965 6/1987 Japan .

OTHER PUBLICATIONS

Logical Image Controller MN8617 User's Manual, 2nd Ed., Matsushita Electronics Corp.

Primary Examiner—James J. Groody
Assistant Examiner—Jerome Grant, II
Attorney, Agent, or Firm—Pollock, Vande Sande & Priddy

[57] ABSTRACT

An image processing apparatus includes a memory having a first region and a second region. The first memory region holds original image data. A first calculation device calculates addresses of segments of the first memory region. A second calculation device calculates addresses of segments of the second memory region. The original image data are transferred from the first memory region to the second memory region in accordance with the calculated addresses of the segments of the first and second memory regions. The first calculation device and the second calculation device are mutually independent. The calculation of the addresses of the segments of the first memory region is performed simultaneously with the calculation of the addresses of the segments of the second memory region.

5 Claims, 6 Drawing Sheets

IMAGE PROCESSING APPARATUS

BACKGROUND OF THE INVENTION

This invention generally relates to an image processing apparatus. For example, this invention relates to an apparatus for copying image data from a section of an image memory.

Logical Image Controller MN8617 User's Manual (second edition), published by Matsushita Electronics Corporation, pages 7-12 and 47-55, discloses image processing in connection with copy and transfer of image data in an image memory.

It is advantageous to increase the speed of image processing. In addition, simple image processing is desired.

SUMMARY OF THE INVENTION

It is an object of this invention to provide a high-speed image processing apparatus.

It is another object of this invention to provide a simple image processing apparatus.

In accordance with this invention, an image processing apparatus includes a memory having a first region and a second region. The first memory region holds original image data. A first calculation device calculates addresses of segments of the first memory region. A second calculation device calculates addresses of segments of the second memory region. The original image data are transferred from the first memory region to the second memory region in accordance with the calculated addresses of the segments of the first and second memory regions. The first calculation device and the second calculation device work concurrently. The calculation of the addresses of the segments of the first memory region is performed simultaneously with the calculation of the addresses of the segments of the second memory region.

DESCRIPTION OF THE FIRST PREFERRED EMBODIMENT

Figure 1:
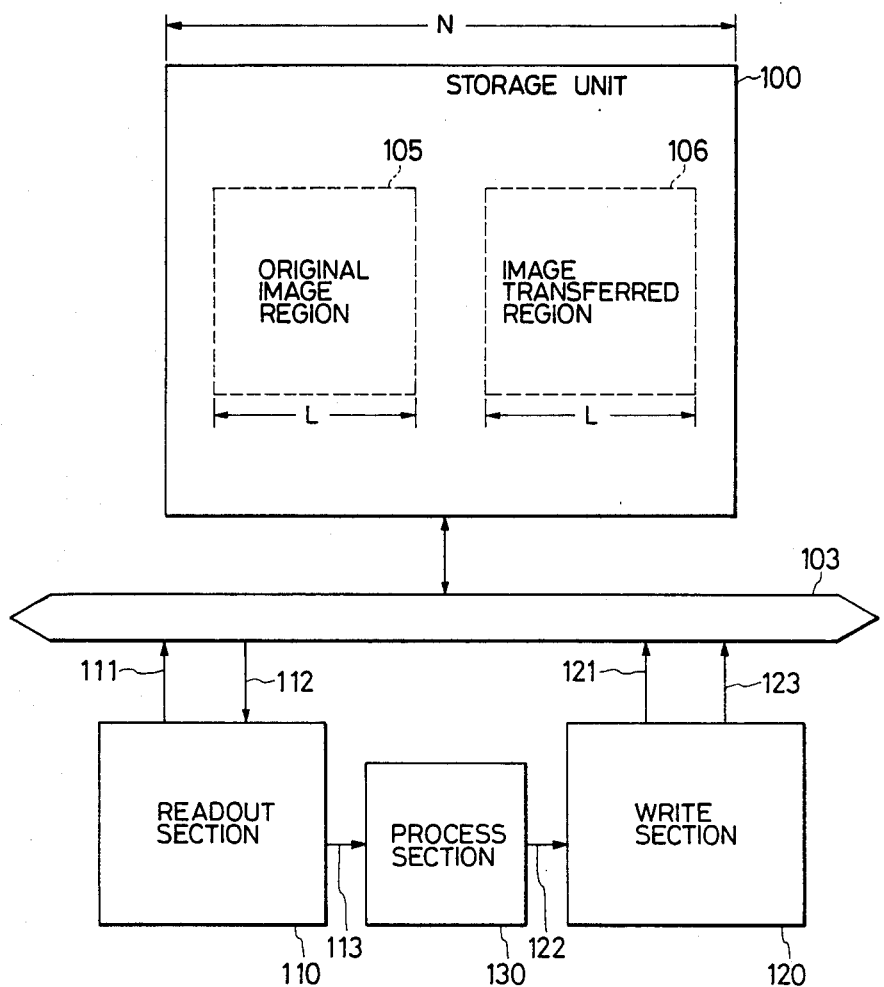
FIG. 1 is a block diagram of an image processing apparatus according to a first embodiment of this invention.

With reference to FIG. 1, an image processing apparatus according to a first embodiment of this invention includes a storage unit or image memory 100, an image data readout section 110, and an image data write section 120 mutually connected via a bus 103. The bus 103 includes an address line 111 connected to the readout section 110, a data line 112 connected to the readout section 110, an address line 121 connected to the write section 120, and a data line 123 connected to the write section 120. A data processing section 130 is connected between the readout section 110 and the write section 120 via data lines 113 and 122.

The readout section 110 fetches image data from a region 105 of the storage unit 100 via the bus 103 and transfers them to the data processing section 130 via the data line 113. The region 105 is referred to as the original image region hereinafter. The processing section 130 derives processed image data from the inputted image data through a data process. The processing section 130 outputs the processed image data to the write section 120. The write section 120 transfers the processed image data to another region 106 of the storage unit 100. The region 106 is referred to as the image transferred region hereinafter.

Calculation of addresses of segments of the original image region 105 and calculation of addresses of segments of the image transferred region 106 are independently performed by the readout section 110 and the write section 120 respectively, so that the two address calculations can be performed simultaneously and thus efficient processing is allowed.

The storage unit 100 holds image data in unit of a word. The capacity of the storage unit 100 has a transverse dimension corresponding to a word number N. The original image region 105 and the image transferred region 106 have a transverse dimension corresponding to a word number L.

Figure 2:
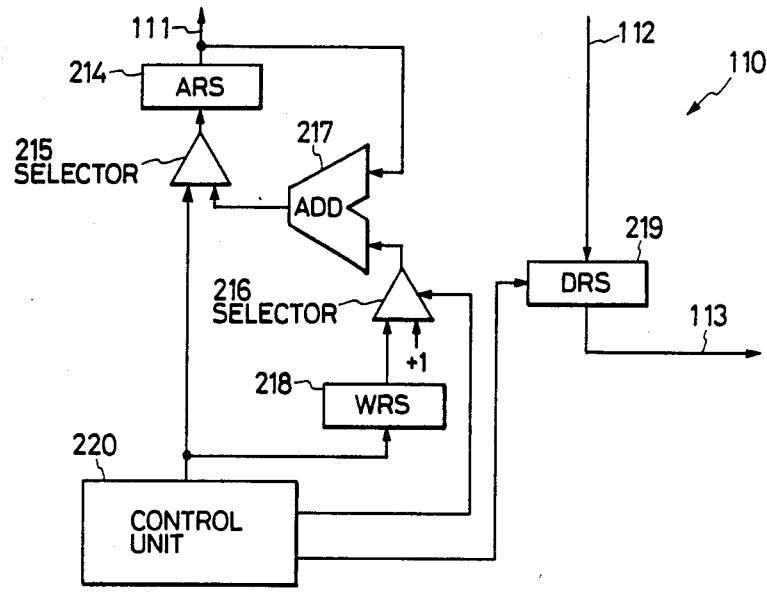
FIG. 2 is a block diagram of the readout section or FIG. 1.

As shown in FIG. 2, the readout section 110 includes an address register 214 having an input terminal connected to an output terminal of a selector 215. An output terminal of the address register 214 is connected to the storage unit 100 (see FIG. 1) via the address line 111 and is also connected to a first input terminal of an adder 217. A second input terminal of the adder 217 is connected to an output terminal of a selector 216. An output terminal of the adder 217 is connected to a first input terminal of the selector 215. A second input terminal of the selector 215 is connected to a control unit 220. A first input terminal of the selector 216 is connected to an output terminal of a word register 218. A second input terminal of the selector 216 is subjected to a digital signal representing a value "1". A control terminal of the selector 216 is connected to the control unit 220. An input terminal of the word register 218 is connected to the control unit 220. The word register 218 holds a digital signal representing a value "N−L+1" which corresponds to the transverse word number N of the storage unit 100 minus the transverse word number L of the original image region 105. An input terminal of a data register 219 is connected to the storage unit 100 (see FIG. 1) via the data line 112. An output terminal of the data register 219 is connected to the data processing section 130 (see FIG. 1) via the data line 113. A control terminal of the data register 219 is connected to the control unit 220.

The control unit 220 preferably includes a combination of a central processing unit (CPU), a program memory, and a random-access memory (RAM). The control unit 220 preferably operates in accordance with a program stored in the program memory.

The control unit 220 controls the selector 216 in accordance with whether or not the contents of a digital signal held in the address register 214 correspond to a word located at a right-hand edge of the original image region 105 of the storage unit 100. Specifically, when the contents of the address register 214 correspond to the right-hand edge word, the control unit 220 orders the selector 216 to select the contents of a digital signal held in the word register 218 and to transfer them to the adder 217. In this case, a digital output signal from the adder 217 represents "ARS+N-L+1" where the character ARS denotes the contents of the address register 214. When the contents of the address register 214 do not correspond to the right-hand edge word, the control unit 220 orders the selector 216 to select the "1" signal and to transfer it to the adder 217. In this case, the output signal from the adder 217 represents "ARS+1". The output signal from the adder 217 representing "ARS+N-L+1" or "ARS+1" is transferred to the address register 214 via the selector 215 so that the contents of the address register 214 are updated.

After the contents of the address register 214 are updated, the control unit 220 outputs a readout enabling command signal to the storage unit 100 (see FIG. 1) and orders the address register 214 to output an address signal representative of the contents of the address register 214 to the storage unit 100 via the address line 111. As a result, an image data word is read out from a segment of the original image region 105 (see FIG. 1) which is designated by the contents of the address register 214. The readout image data word is transferred from the storage unit 100 to the data register 219 via the data line 112. The image data word is outputted from the data register 219 to the processing section 130 (see FIG. 1) via the data line 113 and is processed by the processing section 130 into a processed image data word.

Figure 3:
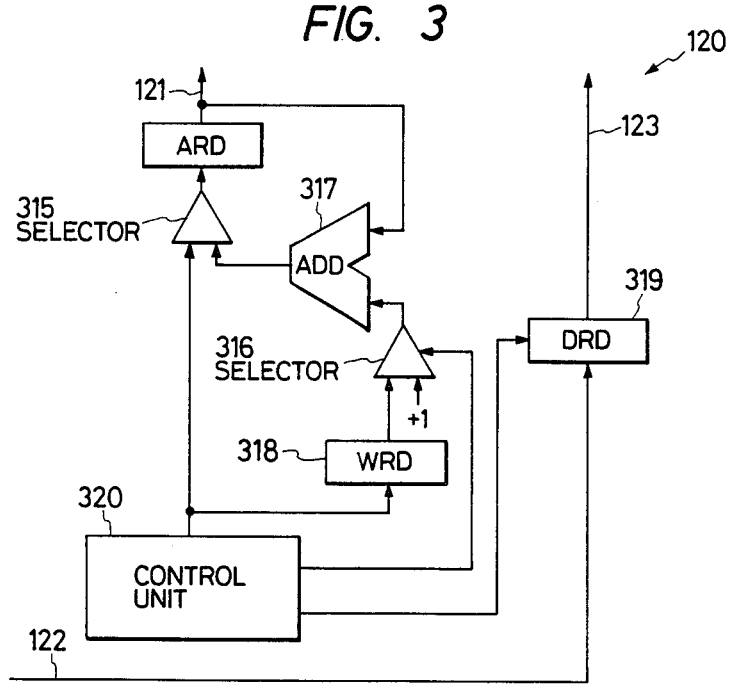
FIG. 3 is a block diagram of the write section of FIG. 1.

As shown in FIG. 3, the write section 120 includes an address register 314 having an input terminal connected to an output terminal of a selector 315. An output terminal of the address register 314 is connected to the storage unit 100 (see FIG. 1) via the address line 121 and is also connected to a first input terminal of an adder 317. A second input terminal of the adder 317 is connected to an output terminal of a selector 316. An output terminal of the adder 317 is connected to a first input terminal of the selector 315. A second input terminal of the selector 315 is connected to a control unit 320. A first input terminal of the selector 316 is connected to an output terminal of a word register 318. A second input terminal of the selector 316 is subjected to a digital signal representing a value "1". A control terminal of the selector 316 is connected to the control unit 320. An input terminal of the word register 318 is connected to the control unit 320. The word register 318 holds a digital signal representing a value "N−L+1" which corresponds to the transverse word number N of the storage unit 100 minus the transverse word number L of the original image region 105. An input terminal of a data register 319 is connected to the processing section 130 (see FIG. 1) via the data line 122. An output terminal of the data register 319 is connected to the storage unit 100 (see FIG. 1) via the data line 123. A control terminal of the data register 319 is connected to the control unit 320. The data register 319 holds a processed image data word outputted from the processing section 130 (see FIG. 1).

The control unit 320 preferably includes a combination of a processing unit, a program memory, and a random-access memory (RAM). The control unit 320 preferably operates in accordance with a program stored in the program memory.

The control unit 320 controls the selector 316 in accordance with whether or not the contents of a digital signal held in the address register 314 correspond to a word located at a right-hand edge of the image transferred region 106 of the storage unit 100. Specifically, when the contents of the address register 314 correspond to the right-hand edge word, the control unit 320 orders the selector 316 to select the contents of a digital signal held in the word register 318 and to transfer them to the adder 317. In this case, a digital output signal from the adder 317 represents "ARS+N−L+1" where the character ARS denotes the contents of the address register 314. When the contents of the address register 314 do not correspond to the right-hand edge word, the control unit 320 orders the selector 316 to select the "1" signal and to transfer it to the adder 317. In this case, the output signal from the adder 317 represents "ARS+1". The output signal from the adder 317 representing "ARS+N−L+1" or "ARS+1" is transferred to the address register 314 via the selector 315 so that the contents of the address register 314 are updated.

After the contents of the address register 314 are updated, the control unit 320 orders the address register 314 to output an address signal representative of the contents of the address register 314 to the storage unit 100 (see FIG. 1) via the address line 121 and also orders the data register 319 to output an image data signal representative of the contents of the data register 319 to the storage unit (see FIG. 1) via the data line 123. Simultaneously, the control unit 320 outputs a write enabling command signal to the storage unit 100. As a result, an image data word outputted from the data register 319 is written into a segment of the image transferred region 106 (see FIG. 1) which is designated by the contents of the address register 314.

The processing section 130 receives the original image data from the readout section 110 via the data line 113 and converts them into a processed image data through a predetermined arithmetic process. The processed image data is outputted from the processing section 130 to the write section 120 via the data line 122. In the case of pure or exact copy and transfer of image data from the original image region 105 to the image transferred region 106, the processing section 130 may be omitted and thus the readout section 110 and the write section 120 may be directly coupled via the data lines 113 and 122.

The updating of the contents of the address register 214 in the readout section 110 allows scanning of the original image region 105 so that the original image data are sequentially read out from the respective segments of the original image region 105 and transferred to the readout section 110. The readout original image data are sequentially transferred to the data processing section 130 and processed therein into processed image data. The processed image data are sequentially transferred to the write section 120. The updating of the contents of the address register 314 in the write section 120 allows the processed data to be sequentially written into respective segments of the image transferred region 106.

Figure 4:
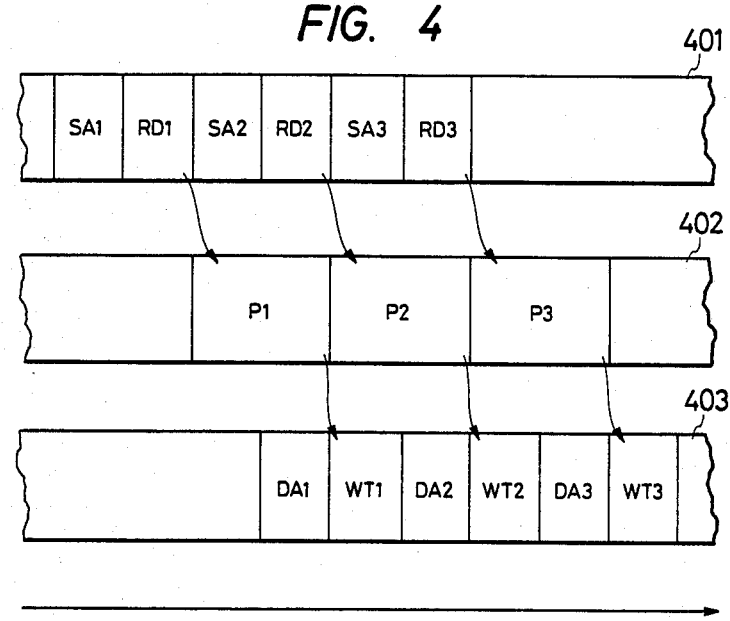
FIG. 4 is a timing diagram of operations of the essential elements of FIG. 1.

FIG. 4 is a timing chart of operation of the image processing apparatus. Portions 401, 402, and 403 denote operation of the readout section 110, operation of the data processing section 130, and operation of the write section 120 respectively. During an interval SAn (n=1, 2, ...) in the portion 401, the address for reading out the n-th word is calculated. During an interval RDn (n=1, 2, ...) in the portion 401, the n-th word is read out. During an interval Pn (n=1,2, ...) in the portion 402, the n-th word is processed. During an interval DAn (n=1, 2, ...) in the portion 403, the address for writing the n-th word is calculated. During an interval WTn (n=1, 2, ...) in the portion 403, the n-th word is written.

As understood from FIG. 4, the readout section 110, the write section 120, and the data processing section 130 operate simultaneously and independently. Accordingly, a high-speed process is allowed.

DESCRIPTION OF THE SECOND PREFERRED EMBODIMENT

Figure 5:
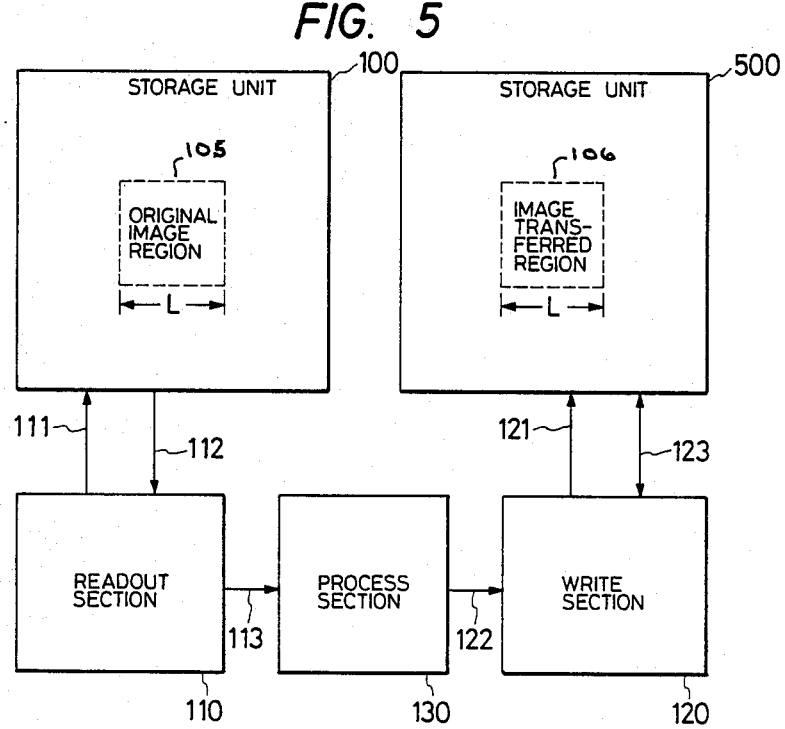
FIG. 5 is a block diagram of an image processing apparatus according to a second embodiment of this invention.

FIG. 5 shows a second embodiment of this invention, which is similar to the embodiment of FIGS. 1-4 except for the following design changes.

The embodiment of FIG. 5 includes a second storage unit 500 connected to the write section 120 via the address line 121 and the data line 123. Image data copied from the original image region 105 of the first storage unit 100 are transferred to an image transferred region 106 of the second storage unit 501. Access to the first storage unit 100 and access to the second storage unit 500 are performed simultaneously and independently so that a higher-speed process is enabled.

DESCRIPTION OF THE THIRD PREFERRED EMBODIMENT

Figure 6:
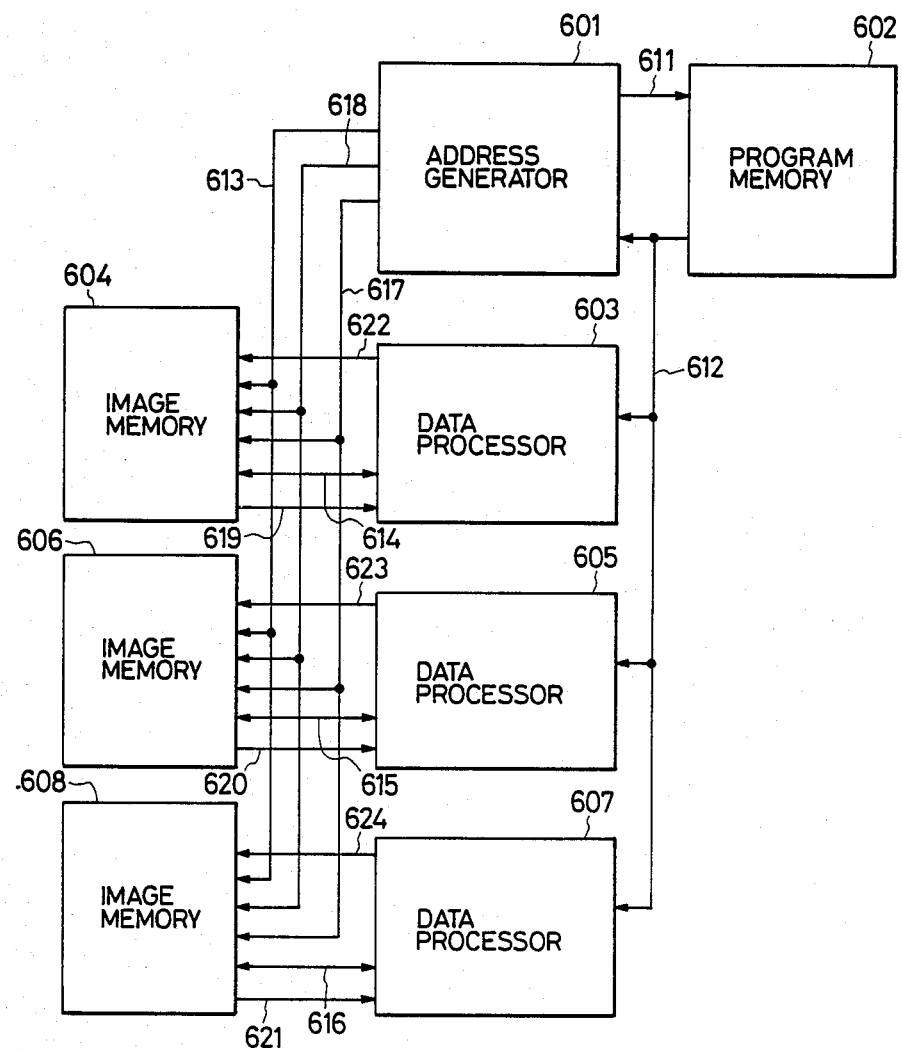
FIG. 6 is a block diagram of an image processing apparatus according to a third embodiment of this invention.

With reference to FIG. 6, an image processing apparatus according to a third embodiment of this invention includes an address generator 601 connected to a program memory 602 via an address line 611 and a data line 612. The address generator 601 is also connected to image memories 604, 606, and 608 via an address line 613, a control bus 617, and a signal line 618. The program memory 602 is connected to data processors 603, 605, and 607 via the data line 612. The data processor 603 and the image memory 604 are connected via a data bus 614, a signal line 619, and a control line 622. The data processor 605 and the image memory 606 are connected via a data bus 615, a signal line 620, and a control line 623. The data processor 607 and the image memory 608 are connected via a data bus 616, a signal line 621, and a control line 624.

The data processor 603 acts on image data stored in the image memory 604. The data processor 605 acts on image data stored in the image memory 606. The data processor 607 acts on image data stored in the image memory 608.

First, second, and third control signals are transmitted among the address generator 601, and the image memories 604, 606, and 608 via the control bus 617. Specifically, the first signal represents whether the current information or signal on the address line 613 corresponds to an address for an original image or an address for a transferred image. The second signal represents whether the current information or signal on the address line 613 corresponds to a readout address or a write address. The third signal includes a signal for the synchronization of the devices 601, 603, 605, and 607. Control signals transmitted from the data processors 603, 605, and 607 to the image memories 604, 606, and 608 via the control lines 622, 623, and 624 are used to discriminate readout and write. These control signals are outputted synchronously with the generation of an address signal. The signal lines 618-621 are used to transfer boundary information.

The address generator 601 outputs addresses of instructions, to be executed, to the program memory 602 via the address line 611. As a result, the program memory 602 outputs the instructions to be executed, the instructions being simultaneously transferred to the address generator 601, and the data processors 603, 605, and 607 via the data line 612.

The address generator 601 generates addresses of segments of original image regions of the image memories 604, 606, and 608, the original image regions containing image data to be copied and processed. The generated addresses are transferred to the image memories 604, 606, and 608 via the address line 613.

The address generator 601 outputs a predetermined special digital signal to the memories 604, 606, and 608 via the signal line 618. The special signal depends on the location of a word denoted by the current address transferred to the image memories 604, 606, and 608. Specifically, the special signal assumes "10", "01", and "00" when the word denoted by the current address is located at a left-hand edge of an original image region, at a right-hand edge of the original image region, and between the left-hand and right-hand edges of the original image region respectively. The special signal "10" and the special signal "01" are referred to as the left-hand edge flag and the right-hand edge flag respectively. The special signal "10" and the special signal "01" are also referred to as boundary flags.

The image memories 604, 606, and 608 receive the addresses and the boundary flags and hold them in corresponding relationships. During a subsequent stage where image data to be processed are transferred from the image memories 604, 606, and 608 to the data processors 603, 605, and 607, the image memories synchronously output the image data and the boundary flags corresponding to the addresses of the image data and thereby inform the data processors of whether or not the image data to be processed are located at the edges of the original image regions. The data processor 603 receives the image data corresponding to the address and the boundary flag corresponding to the image data from the image memory 604 via the data bus 614 and the boundary information bus 619. The data processor 603 processes the received image data in accordance with the instructions supplied from the program memory 602. This process of the image data depends on whether or not the image data are located at the edges of the original image region. In this way, the data processor 603 derives a processed image data from the original image data. Similarly, the data processor 605 receives the image data and the boundary flag from the image memory 606 via the data bus 615 and the boundary information bus 620, and processes the received image data and derives a processed image data. Also, the data processor 607 receives the image data and the boundary flag from the image memory 608 via the data bus 616 and the boundary information bus 621, and processes the received image data and derives a processed image data.

The processed image data are transferred from the data processors 603, 605, and 607 to the image memories 604, 606, and 608 and are written in image transferred regions of the image memories in accordance with the addresses supplied from the address generator 601 to the image memories.

Figure 9:
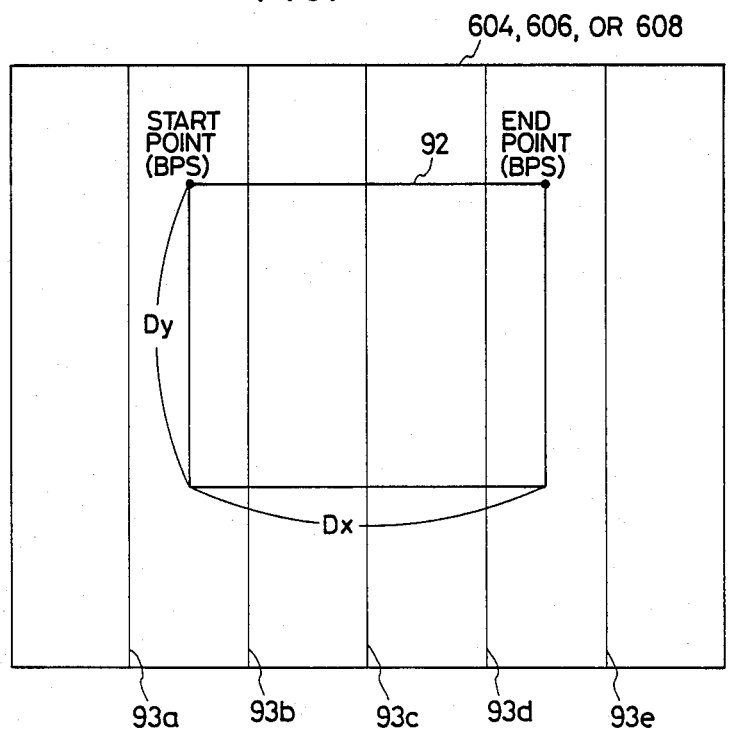
FIG. 9 is a diagram of one of the image memories of FIG. 6.

The image memories 604, 606, and 608 have similar internal designs. As shown in FIG. 9, the image memory 604, 606, or 608 has a rectangular original image region 92 having start points BPS extending along a left-hand edge and end points BPE extending along a right-hand edge. The original image region 92 has a transverse dimension corresponding to Dx bits and a longitudinal dimension corresponding to Dy lines. In FIG. 9, lines 93a, 93b, 93c, 93d, and 93e are boundaries between words in the image memory. In one example, the transverse dimension Dx of the original image region 92 extend over four words and the longitudinal dimension Dy of the original image region corresponding to nine lines. It is now assumed that access to the image memory is performed in unit of one word having 16 bits and that the image data are processed sequentially line by line. A start point BPS can be located at any bit within one word. The address of a word containing a start point BPS is represented by the variable ADDR. The location of a start bit BPS is represented by the variable BPS.

Figure 7:
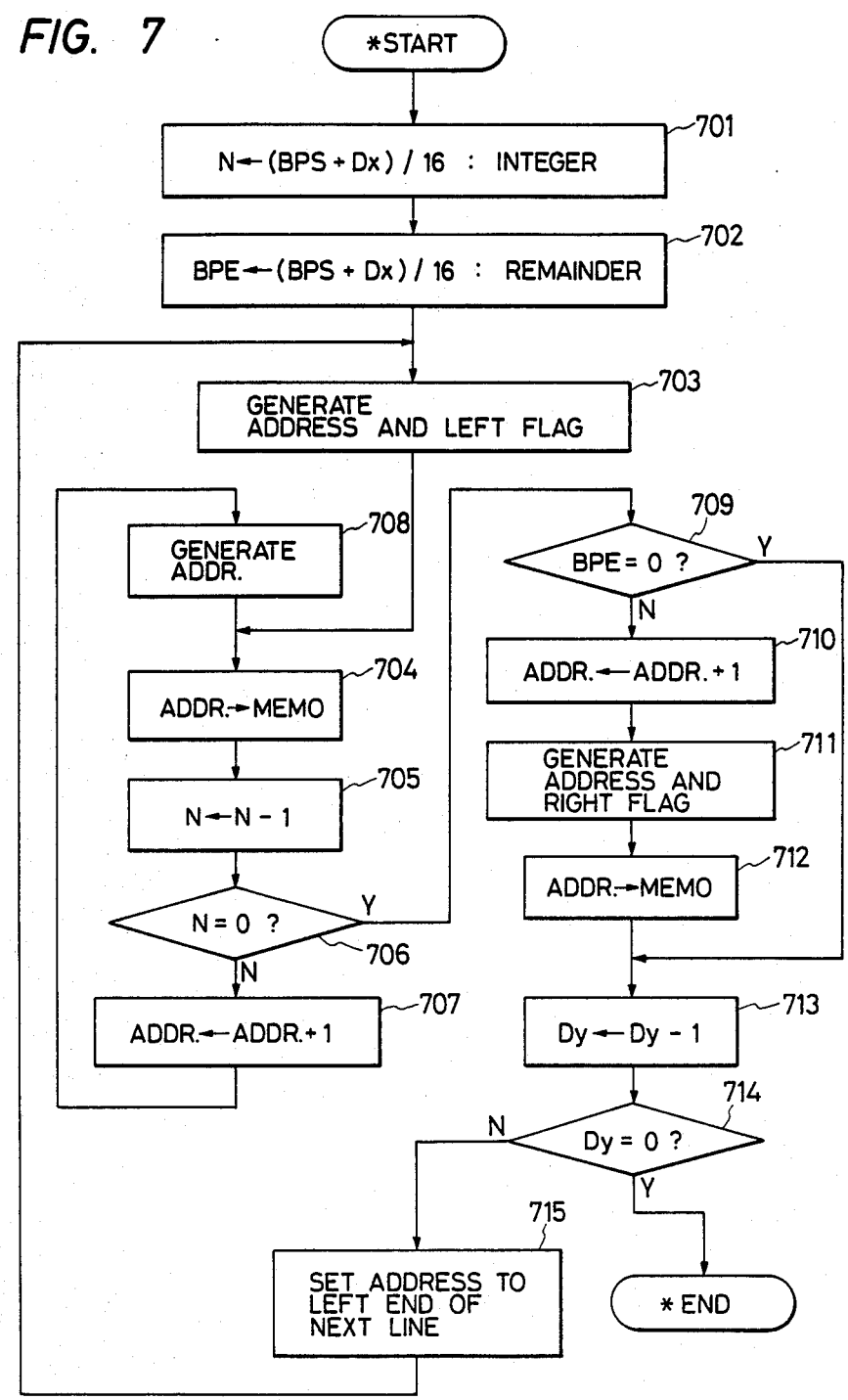
FIG. 7 is a flowchart of operation of the address generator of FIG. 6.

FIG. 7 is a flowchart of operation of the address generator 601. As shown in FIG. 7, a first block 701 of the flowchart calculates the number of words in a line which do not have an end point. Specifically, the word number is given by the integer part of the result of the calculation "(BPS+Dx)/16". The calculated word number is written in the variable N.

A block 702 subsequent to the block 701 calculates the bit location of the end point. Specifically, the bit location of the end point is given by the remainder of the result of the division "(BPS+Dx)/16". The calculated bit location of the end point is written in the variable BPE. After the block 702, the operation of the address generator 601 advances to a block 703.

The block 703 generates an address and a left-hand edge flag. After the block 703, the operation of the address generator 601 advances to a block 704.

The block 704 performs access to the image memories. Specifically, the block 704 applies the generated address to the image memories to transfer image data from a segment of the image memories, designated by the address, to the data processors. After the block 704, the operation of the address generator 601 advances to a block 705.

The block 705 decrements the word number N by "1". After the block 705, the operation of the address generator 601 advances to a block 706.

The block 706 determines whether or not the word number N equals "0". When the word number N differs from "0", the operation of the address generator 601 advances to a block 707. When the word number N equals "0", the operation of the address generator 601 advances to a block 709.

The block 707 increments the contents of an address register by "1". It should be noted that the address register is included in the address generator 601. After the block 707, the operation of the address generator 601 advances to a block 708.

The block 708 generates an address corresponding to the contents of the address register. After the block 708, the operation of the address 601 returns to the block 704. The blocks 707, 708, 704, and 705 are periodically reiterated until the word number N reaches "0".

The block 709 determines whether or not the value BPE equal "0". When the value BPE differs from "0", the operation of the address generator 601 advances to a block 710. When the value BPE equals "0", the operation of the address generator 601 jumps to a block 713.

The block 710 increments the contents of the address register by "1". After the block 710, the operation of the address generator 601 advances to a block 711.

The block 711 generates an address corresponding to the contents of the address register and also generates a right-hand edge flag. After the block 711, the operation of the a generator 601 advances to a block 712.

The block 712 performs access to the image memories. Specifically, the block 712 applies the generated address to the memories to transfer image data from a segment of the memories, designated by the address, to the data. After the block 712, the operation of the address 601 advances to the block 713.

The block 713 decrements the value Dy by "1". After the block 713, the operation of the address generator 601 advances to a block 714.

The block 714 determines whether or not the value Dy equals "0". When the value Dy differs from "0", the operation of the address generator 601 advances to a block 715. When the value Dy equals "0", the operation of the address generator 601 ends.

The block 715 sets the contents of the address register so as to correspond to a left-hand end of a subsequent line. After the block 715, the operation of the address generator 601 returns to the block 703.

The blocks 703–715 are periodically reiterated until the value Dy reaches "0".

The operation of the address generator 601 will be further described in the example where the original image region 92 extends over four words and nine lines. The blocks 701 and 702 correspond to initialization. Since the first word in the first line is located at the left-hand edge, the generation of the address and the left-hand flag of the first word is performed by the block 703. The access to the image memories is performed by the block 704. The blocks 705 and 706 serve to determine whether or not the processed word is located at the right-hand end of the line. After the block 707, the operation of the address generator 601 advances to the block 708 by which the address of the second word is generated. The second execution of the blocks 704 and 705 following the block 708 relates to the second word. Similarly, the second execution of the block 708 generates the address of the third word. The third execution of the blocks 704 and 705 relates to the third word. Then, the operation of the address generator 601 moves from the block 706 to the block 709 since the fourth word is located at the right-hand end of the line. The steps 710, 711, and 712 serve to generate the address of the right-hand edge word and the right-hand flag. The block 714 determines whether or not the current line is final. When the current line is not final, the operation of the address generator 601 returns to the block 703 via the block 715. Accordingly, the process for generating the address of the first word of the second line is started. The address generator 601 operates on the respective words in the second line in a manner similar to the operation on the respective words of the first line.

Figure 8:
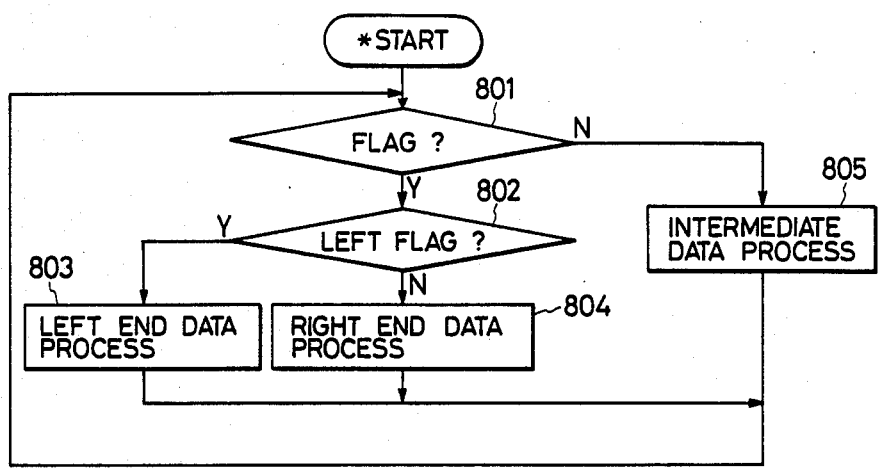
FIG. 8 is a flowchart of operation of the data processor of FIG. 6.

The data processors 603, 605, and 607 operate similarly. FIG. 8 is a flowchart of operation of the data processor 603, 605, or 607. As shown in FIG. 8, a first block 801 of the flowchart determines whether or not inputted image data are accompanied by a boundary flag. When the inputted image data are accompanied by the boundary flag, the operation of the data processor advances to a block 802. When the inputted image data are not accompanied by the boundary flag, the operation of the data processor advances to a block 805.

The block 802 determines whether or not the boundary flag is a left-hand edge flag. When the boundary flag is a left-hand edge flag, the operation of the data processor advances to a block 803. When the boundary flag is not a left-hand edge flag, that is, when the boundary flag is a right-hand edge flag, the operation of the data processor advances to a block 804.

The block 803 processes the left-hand edge data in order to protect image data stored in a range extending leftward of the start point BPS. After the block 803, the operation of the data processor returns to the block 801.

The block 804 processes the right-hand edge data in order to protect image data stored in a range extending rightward of the end point BPE. After the block 804, the operation of the data processor returns to the block 801.

The block 805 processes image data in an intermediate range without any points BPS and BPE. After the block 805, the operation of the data processor returns to the block 801.

The operation of the data processor in FIG. 8 is reiterated each time image data are inputted into the data processor.

Since the first word in the first line is located at the left-hand edge of the first line, process of the image data corresponding to the first word in the first line is performed by the blocks 801, 802, and 803. Processes of the image data corresponding to the intermediate words in the first line are performed by the blocks 801 and 805. Since the fourth word in the first line is located at the right-hand edge of the first line, process of the image data corresponding to the fourth word in the first line is performed by the blocks 801, 802, and 804. When the process of the fourth word in the first line is completed, the process of the first word in the second line is started. The processes of the respective words in the second and later lines are similar to the processes of the respective words in the first line.

As understood from the previous description, the address generator 601 adds boundary information to addresses corresponding to boundaries of original image regions. The boundary information is transferred to the image memories 604, 606, and 608. When the data processors 603, 605, and 607 fetch image data from the image memories, the image data and the boundary information are synchronously transferred from the image memories to the data processors. This function allows a simple structure of the data processors since it is unnecessary for the data processors to hold and process the start bit position BPS and the transverse bit number Dx.

Since the boundary information outputted from the address generator 601 is transferred to the data processors 03, 605, and 607 via the image memories 604, 606, and 608, it is unnecessary to synchronously operate the address generator and the data processors so that high-speed and flexible processing are enabled.

The structure and function of the apparatus of FIGS. 1 and 5 may be applied to the address generator 601.

What is claimed is:
1. An image processing apparatus comprising:
   (a) a memory having a first region and a second region, the first region holding original image data;
   (b) first calculation means for calculating addresses of segments of the first memory region;
   (c) second calculation means for calculating addresses of segments of the second memory region;
   (d) means for transferring the original image data from the first memory region to the second memory region in accordance with the calculated addresses of the segments of the first and second memory regions;
   wherein the first calculation means and the second calculation means are mutually independent, and the calculation of the addresses of the segments of the first memory region is performed in parallel and simultaneously with the calculation of the addresses of the segments of the second memory region.
2. The apparatus of claim 1 wherein the transferring means comprises:
   (a) means for reading out the original image data from the first memory region in accordance with the calculated addresses of the segments of the first memory region; and
   (b) means for writing the readout original image data into the second memory region in accordance with the calculated addresses of the segments of the second memory region.
3. The apparatus of claim 1 wherein the first calculation means comprises:
   (a) a register holding an address;
   (b) means for determining whether or not the address in the register corresponds to a segment located at an edge of the first memory region;
   (c) means for adding the address in the register and a unit value and thereby deriving a new address when the address in the register does not correspond to a segment located at an edge of the first memory region;
   (d) means for adding the address in the register and a given value different from the unit value and thereby deriving a new address when the address in the register corresponds to a segment located at an edge of the first memory region; and
   (e) means for replacing the address in the register with the new address and thereby updating the address in the register.
4. The apparatus of claim 1 wherein the memory includes first and second separate sub-memories having the first and second regions respectively.
5. The apparatus of claim 1 further comprising means for processing the readout image data before the data are transferred to the second memory region.

* * * * *